Patented Nov. 18, 1941

2,263,015

UNITED STATES PATENT OFFICE 2,263,015

SHEETING

Paul C. Seel, Rochester, N. Y., assignor to Eastman Kodak Company, Rochester, N. Y., a corporation of New Jersey No Drawing. Application February 9, 1937, Serial No. 124,925

3 Claims. (Cl. 91—70)

This invention relates to the manufacture of coated sheets, tape and films and, more particularly, to a composite transparent sheet comprised of a cellulose derivative base coated with a transparent thermoplastic synthetic resin.

The manufacture of various coated sheets, tapes and films for a variety of purposes has commercial importance and has been the subject of considerable investigation. For example, in my Patents Nos. 1,496,359, 1,687,041, 1,687,042 and 1,933,824, I have shown a number of different types of coated sheets, films, tape and the like, together with some of the articles of manufacture resulting therefrom and methods of use and manufacture. In addition to the aforementioned types of coated sheets, I have now found a novel article of manufacture comprising a cellulose derivative base supporting an attached coextensive heat-sensitive, non-tacky layer or skin of thermoplastic synthetic resins. This article of manufacture also has a number of methods for its manufacture and uses commercially.

This invention has for an object to provide an article of manufacture comprising a flexible cellulose derivative film that is transparent and supports a heat and pressure-sensitive, non-tacky, fusible skin of a thermoplastic synthetic resin. Still another object is to provide a flexible transparent film comprised of a cellulose ester surface on one side with a non-tacky, heat and pressure-sensitive thermoplastic synthetic resin. A still further object is to provide a transparent or translucent cellulose derivative composite film which may be rolled, stacked and otherwise handled or employed. A still further object is to provide a transparent or translucent flexible composite film or tape comprised of a cellulose derivative supporting thermoplastic synthetic resin which is heat and pressure-sensitive and capable of heat lamination. Still another object is to provide a transparent or translucent flexible composite sheet, tape or film, the surfaces of which are non-tacky. Still another object is to provide as an article of manufacture a transparent sheet or tape comprised of a cellulose derivative base supporting a synthetic resin, a surface of which article of manufacture is capable of heat fusing to colored or printed and other type surfaces. Still another object is to provide a method for preparing the aforementioned article of manufacture. Other objects will appear hereinafter.

I have found that a novel and useful article of manufacture in the form of a composite sheet, tape or film may be comprised of a cellulose derivative base supporting an attached, non-tacky, thermoplastic, synthetic resin. The cellulose derivative base should be transparent or translucent and may comprise the known cellulose derivatives usually used for sheeting, film or the like, namely, cellulose acetate and cellulose nitrate. The synthetic thermoplastic resin will likewise be transparent or translucent and may comprise any one of several known resins, such as, for example, polymerized vinyl chloride. The several Ostromislensky patents of which may be mentioned 1,721,034 and 1,791,009 may be referred to for a description of various forms of polymerized vinyl chloride, and their manufacture.

However, I will set forth hereinafter further details relative to the manufacture, solution and other information respecting synthetic resins. In the following description, for convenience of reference and brevity, the following terms or abbreviations may be used. There are several modifications of polymerized vinyl chloride, and the terms alpha, beta and caouprene chloride all refer to the synthetic resin. Inasmuch as a detailed discussion relative to the manufacture and properties of various cellulose derivatives, such as cellulose acetate and cellulose nitrate, may be found in a number of patents and publications, an extended description thereof will be omitted from the present application. The term subbing solution as employed herein refers to solutions suitable for coating. That is, a subbing solution as used herein means liquids or solutions which are capable of forming a skin, film, tape, layer or other deposit when cast or coated out, dried, evaporated or otherwise treated, the sub being the resultant skin, film or layer.

As already mentioned, there are several modifications of polymerized vinyl chloride (caouprene chloride) namely: alpha, beta, delta and gamma. The alpha modification is fairly soluble in acetone, although it does not produce a solution of the same consistency as either acetate or nitrate dope. The beta modification is insoluble in acetone, but is somewhat soluble in a mixture of chlorobenzene and acetone to approximately a 6-8% solution.

Very little difficulty, if any, has been experienced in the manufacture of vinyl chloride from ethylene chloride. The vinyl chloride may be polymerized into one of a number of the aforementioned modifications of the so-called caouprene chloride.

The polymerization of vinyl chloride into one of the four forms aforementioned may be accomplished either by exposing the vinyl chloride liquid under pressure in sealed tubes to ultra-violet light or to sunlight, or by exposing the vinyl chloride absorbed in such solvents as acetone, ethyl alcohol, methyl alcohol, chlorobenzene, etc., to the action of either ultra-violet lamps or sunlight.

It is preferable to use quartz containers for this operation as ordinary glass containers absorb a large percentage of the ultra-violet rays and the reaction time is thereby lengthened. Various methods known and disclosed in the prior art for producing the polymerized vinyl resins may be employed.

The following examples which I have carried out, or had carried out, under my direction, indicate how vinyl chloride may be polymerized, dissolved and otherwise treated. For example, it is possible to polymerize liquified vinyl chloride in quartz containers under an ultra-violet light in about twelve hours' time to the beta modification. It is also possible by exposing the liquified vinyl chloride in a quartz tube to sunlight and, after a period of time, polymerization will take place.

Another treatment which has been given the polymerized product in methyl alcohol has been to remove the polymerized product from the polymerization treatment, filter, dry and weigh it. It was then extracted for at least twenty-six hours in acetone in an extraction apparatus. Following the extraction it was removed and wet with acetone to purify and then packed in bottles still wet with acetone. It was found that the beta caouprene chloride when once dried after extraction with acetone was more difficult to dissolve. For this reason it was left wet with acetone for further use.

The beta modification may be dissolved for example in a solvent comprising about 75% monochlorobenzene and 25% acetone. The beta modification may be readily dissolved in such a solvent if the temperature is held at between approximately 150° F.-190° F. Various temperatures between, for example. 150-170° F., may be employed for dissolving various amounts of polyvinyl chloride. It is also possible to use other solvents as will be indicated hereinafter, but I prefer to proceed as set forth and employ the chlorobenzene-acetone solvent. The solution containing the synthetic thermoplastic synthetic resin, namely the caouprene chloride solution, may be employed in a number of ways. That is the solution may be coated into skins or sheets comprised solely of the synthetic resin. I have had a number of said sheets prepared and tested. From this and other investigations I am aware that polymerized synthetic resins are heat sensitive and may exert a cementing action. For example, as I have pointed out in connection with other work, vinyl chloride, vinyl acetate, styrene or their polymers may be used as a splicing cement for films either as a liquid or coated out in sheet form. In the case of sheet coatings, the material will be placed between two layers of films to be spliced together and the joint made by applying a moderately warm iron. Synthetic resin-containing solution may be coated on cellulose derivative bases to form composite sheets, tapes or films and it is with this type of article of manufacture and its method of production that I am primarily concerned.

With further respect to the manufacture of composite sheets the following examples have been carried out.

*Example I*

Three cellulose acetate films were coated. One film was coated on one side with a 2% solution of alpha in acetone. Another film was coated on both sides with a 2% solution of alpha in acetone. As apparent from the preceding description the alpha referred to in this example was the alpha form of polymerized vinyl chloride.

*Example II*

Seven cellulose acetate films .005 thick were coated. One film was used for a check. One film was given one coating of beta on the surface. One film was given two coats of beta on the surface. One film was given three coats of beta on the surface and stripped, turned over and stuck down. As apparent from the preceding description, the beta referred to herein was the beta form of polymerized vinyl chloride and the solution comprised of 8% solution of the beta in 75% chlorobenzene and 25% acetone.

*Example III*

Two cellulose acetate films were subbed with a nitrate solution then subbed or coated with a 2% solution of beta caouprene chloride in chlorobenzene and acetone.

*Example IV*

Two cellulose acetate films or skins were coated. One film or skin was subbed with a 3% acetate solution in 75% acetone and 25% chlorobenzene, then subbed or coated with a 3% beta caouprene chloride solution in chlorobenzene, the beta caouprene chloride in this instance stripped off to some extent.

*Example V*

A cellulose derivative film or skin was subbed with 3% of a nitrate cotton in 75% acetone—25% chlorobenzene. This cellulose derivative base was then subbed or coated with a 3% beta caouprene chloride solution in chlorobenzene. The beta caouprene chloride held in this example.

It is apparent from the preceding examples that I have in all instances provided a flexible, translucent, and transparent cellulose derivative base supporting heat and pressure-sensitive non-tacky fusible thermoplastic resins. I have found that cellulose derivative bases in accordance with Example V comprised of cellulose acetate and cellulose nitrate possess certain advantages. For example, cellulose nitrate being more readily available and less expensive may lessen the cost of producing my article of manufacture. In addition, the employment of the cellulose derivative base which I have described in Example V permits the utilization of a greater variety of resins with good adherence than is possible with certain of the other bases. Since I have provided transparent or translucent sheets which are non-tacky, flexible, relatively impervious and insoluble in water, my sheets may be employed or handled in any of the known and usual ways according to which transparent sheets have been employed. For example, the sheets might be employed in a manner similar to or the same as shown in U. S. Patents 458,020, 1,756,919, 1,827,992.

The articles of manufacture described in the aforementioned examples, as already indicated, were produced by a coating process similar to those described in my patents aforementioned. That is, the synthetic resins were dissolved in the chlorobenzene-acetone solvent. The solution was coated uniformly over an area of cellulose derivative. The solvent was substantially completely evaporated therefrom, leaving a relatively thin flexible non-tacky resinous skin adherent to the cellulose derivative base. Various coatings were employed, such as 2%, 5% and 10% solutions of the resin. If desired, the coatings may be cured at between about 160-170° F. for twenty minutes to a half hour. The completed articles of manufacture in the form of sheets, tape or film may be rolled, piled, packaged or otherwise employed as is conventional for similar types of articles.

I claim:

1. A method for the manufacture of thin, flexible, composite, plastic sheeting, which comprises preparing a cellulose acetate base, coating said base with a cellulose nitrate sub coat to form a composite base, coating the nitrate coating with a solution comprised of solvent and a thermoplastic adhesive synthetic vinyl resin, substantially completely evaporating the solvent from the resin coating, thereafter curing the coating by exposing the sheet for about 20 minutes to a half hour to a temperature between about 160°-170° F.

2. A method for the manufacture of thin, flexible, composite, plastic sheeting, which comprises preparing a cellulose derivative base essentially comprised of an organic acid ester of cellulose, coating said base with a cellulose nitrate sub coat to form a composite base, coating the nitrate coating with a solution comprised of solvent and a thermoplastic adhesive synthetic vinyl resin, substantially completely evaporating the solvent from the resin coating, thereafter curing the coating by exposing the sheet for approximately 20 minutes to a half hour to a temperature between approximately 160°-170° F.

3. A method for the manufacture of thin, flexible, composite, plastic sheeting, which comprises preparing a cellulose acetate base, coating said base with a cellulose nitrate sub coat to form a composite base, dissolving a synthetic vinyl resin in a hot solvent therefor, to obtain a coating solution of the resin, coating the nitrate coating with said solution, substantially completely evaporating the solvent from the resin coating, thereafter curing the coating by exposing the sheet for a fraction of an hour to an elevated temperature not higher than about 170° C. which will drive off residual solvent contained in said resin coating.

PAUL C. SEEL.